Figure 1A:
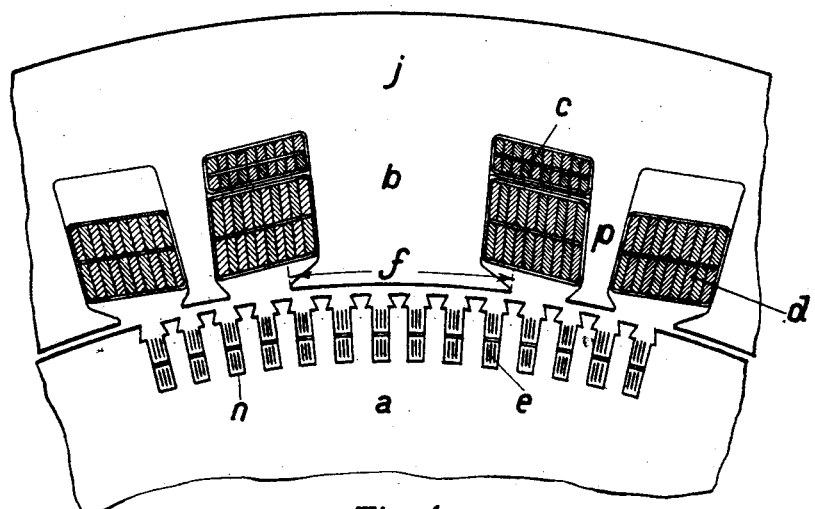

Jan. 1, 1929.

F. PRANTL

HIGH POWER SINGLE PHASE COMMUTATOR MOTOR,
PARTICULARLY FOR TRACTION PURPOSES

Filed Oct. 14, 1924

1,697,138

Inventor
F. Prantl
By Marks & Clerk
Attys.

Patented Jan. 1, 1929.

1,697,138

UNITED STATES PATENT OFFICE.

FRANZ PRANTL, OF BADEN, SWITZERLAND, ASSIGNOR TO AKTIENGESELLSCHAFT BROWN BOVERI AND CIE., OF BADEN, SWITZERLAND.

HIGH-POWER SINGLE-PHASE COMMUTATOR MOTOR, PARTICULARLY FOR TRACTION PURPOSES.

Application filed October 14, 1924, Serial No. 743,632, and in Germany October 15, 1923.

Single-phase commutator motors for large outputs usually have a concentrated exciting winding or an exciting winding distributed in the slots of the stator for the main poles, a compensating winding distributively arranged on the periphery of the stator for neutralizing the armature field, and finally a commutating pole winding embracing one or more teeth for exciting the commutating field necessary for sparkless running. This construction of the high-power single-phase commutator motors is advantageous if the pole pitch is large in comparison with the slot of the armature and the ratio of axial length to polar arc is small. The compensating winding can then be lodged in the stator in a sufficiently large number of slots, so that it is possible to neutralize the armature field almost completely. The disadvantage, which resides in the circumstance that the compensating winding claims a large share of the slot space available, and that it makes the machine more complicated and more expensive, is outweighed by the improvement in the power factor. The compensating winding also assists the commutating-pole winding in the production of the commutating field, so that only a few additional turns on the commutating pole are sufficient for the production of this field. These advantages however no longer exist when it is a question of single-phase commutator motors of large outputs, in which the ratio of axial length to pole arc is greater than 2. In this case the complete neutralization of the armature field by the compensating winding is in practice no longer attainable. Strong local leakage fields arise, which render the effect of the compensating winding negligible. The space required by this winding, however, is to a great extent not available at all, if the axial length of the motor has to be selected large relatively to the polar arc on special constructional grounds. This case arises for example with traction motors, where the power and the axial length of the motor are given by the constructional proportions of the locomotive. Now as the maximum permissible field strength per pole, having regard to the transformer E. M. F. in the armature coil for the time being short-circuited by the brushes, and likewise the flux density in comparison with the power of the motor, are given quantities, the polar arc follows, in the case of this motor, from these given values, and it is found that pole arcs are arrived at which under some circumstances are only 12 to 15 centimetres long. In the case of such motors, however, the relations are fundamentally different, in so far as the armature field cannot build up strongly, because only a few armature slots lie opposite to the small pole arc, and the cross magnetization accordingly proves substantially weaker than when a comparatively long polar arc faces the same armature.

In these special cases, therefore, it is less a question of neutralizing the armature field than of the best possible utilization of the available space, and of rendering effective cooling possible; and the invention relates to a single-phase commutator motor for high powers (more particularly for traction work) in which the ratio of axial length to pole arc is greater than 2. Now according to the invention the stator of this motor, besides the exciting winding for the main poles, constructed as a concentrated winding, is only to receive an exciting winding for the commutating poles, which is also constructed as a concentrated winding. The omission of the special distributed compensating winding has here remarkable advantages. The saving in material and winding space permits of either a smaller specific loading of the copper of the existing windings or of a corresponding raising of the power; in particular the diameter of the armature can be made the greater, according as the stator slots are given less depth on account of the omission of the compensating winding. The possibility of providing cooling ducts is also given by the greater amount of space available, and accordingly the effective cooling of the motor is facilitated. By the concentration of the windings the number of stator slots is reduced to 1 or 2 per pole and the reluctance of the stator is thereby increased just in the axis of the armature ampere turns, in such a way that notwithstanding the omission of the compensating winding the leakage of the motor is not materially greater than it would be in the case of the same motor if it were constructed with a compensating winding. The omission of the coil ends of the compensating winding also renders it possible to increase the axial length by the amount of axial space saved, and thus to attain a maximum of power in a given space, which is extremely important, particularly in the case of locomotives for railway traction.

Figure 1B:
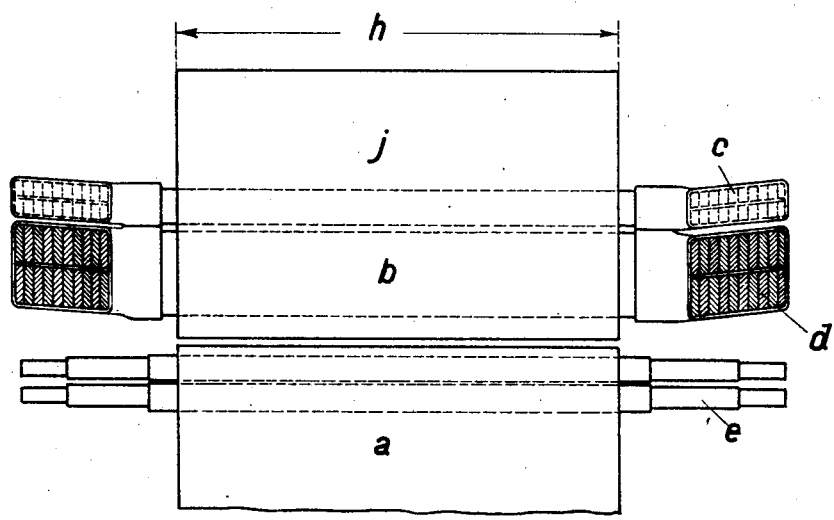

A constructional example of the invention is illustrated in detail in Figures 1ª and 1ᵇ.

In these figures:—
- $a$ denotes the armature;
- $n$ the armature slots;
- $e$ the armature conductors;
- $b$ the main poles;
- $f$ their polar arcs;
- $p$ the commutating poles;
- $c$ the concentrated exciting winding for the main poles;
- $d$ the concentrated exciting winding for the commutating poles;
- $h$ the axial length of the motor.

In the case of this constructional example the ratio of axial length to polar arc ($h/f$) is substantially greater than 2. The employment of a distributed compensating winding would seriously impair the motor, as a complete neutralization of the armature field would not be attainable, notwithstanding the devoting of material and space to the winding. In addition to this a reduction in the motor output could not be avoided. In the case of the construction illustrated, however, as will be obvious, only the conductors of a few armature slots come into question for the exciting of the cross field. The flux density of the transverse field is therefore small in comparison with that of the main field. The employment of only concentrated windings permits however of the best utilization of the space, because the filling factor rises with the concentration of the windings. The reversing pole winding is also constructed as a concentrated winding and is arranged in such a way as to lie nearer to the armature than the winding of the main poles, in order to increase its effectiveness. In case of need the two windings may be placed a certain distance apart, so as to provide cooling ducts, through which the cooling air will be blown.

What I claim is:—

1. A single-phase commutator motor for electric vehicle drives comprising an armature of the commutator type, and a stator comprising only salient main poles, and salient commutator poles cooperating with said armature to develop an output of more than 100 k. w., the length of the armature being at least twice the width of the pole arc, and the stator having only concentrated main field windings and concentrated commutator windings.

2. A single-phase commutator motor for driving vehicles, said motor comprising an armature of the commutator type, and a stator cooperating therewith, the armature being at least twice as long as the width of the pole arc, and the stator having only salient main poles and salient commutator poles with concentrated field windings only on said poles, and no compensating field windings.

In testimony whereof I have signed my name to this specification.

F. PRANTL.